(12) United States Patent
Cao

(10) Patent No.: US 6,800,242 B2
(45) Date of Patent: Oct. 5, 2004

(54) PROCESS FOR MAKING AN ALKALI RESISTANT CERAMIC MATERIAL

(76) Inventor: Xueren Cao, 3 North Road, Hashui, Xegu, Lanzhou 730060 (CN)

( * ) Notice: Subject to any disclaimer, the term of this patent is extended or adjusted under 35 U.S.C. 154(b) by 0 days.

(21) Appl. No.: 10/444,446

(22) Filed: Apr. 14, 2003

(65) Prior Publication Data

US 2003/0211370 A1 Nov. 13, 2003

Related U.S. Application Data

(60) Provisional application No. 60/372,953, filed on Apr. 16, 2002.

(51) Int. Cl.[7] .............................. C04B 33/32; B05D 3/02
(52) U.S. Cl. ....................... 264/660; 264/642; 264/670; 264/679; 427/226; 427/228; 427/380
(58) Field of Search ................................ 427/226, 228, 427/380; 264/642, 660, 670, 679

(56) References Cited

U.S. PATENT DOCUMENTS 5,731,250 A 3/1998 Reid et al.

*Primary Examiner*—Christopher A. Fiorilla
(74) *Attorney, Agent, or Firm*—Melanius D'Souza

(57) ABSTRACT

A process for making an alkaline resistant material comprises the steps of grinding together 0-40% light magnesia, 0-80% roasted magnesia, 10-54% ceramic clay, 0-9% limestone, 1-4% water glass, 0-1.5% carboxymethyl cellusolve, 0-27% talc, 0-3% calcium or barium carbonate to a particle size of less than 50 microns, mixing the ground mixture with water to produce a paste containing <23% wt. water, shaping the paste to a desired shape, drying the shaped product at a temperature of 110 degrees Centigrade, and firing the dried shaped product in a kiln at 1350 degrees Centigrade. The resulting alkali resistant ceramic contains 25-76 wt % MgO, 13-47% $SiO_2$, 5-20 wt % $Al_2O_3$, and 1-10 wt % $Fe_2O_3$, CaO, $K_2O$, and/or $Na_2O$, with forsterite and spinel being the dominant crystalline phases.

2 Claims, No Drawings

PROCESS FOR MAKING AN ALKALI RESISTANT CERAMIC MATERIAL

CROSS-REFERENCE TO RELATED APPLICATIONS

This application claims the benefit of U.S. Provisional Patent Application No. 60/372,953 filed on Apr. 16, 2002.

FIELD OF THE INVENTION

This invention relates to ceramic regenerative heat transfer media for use in Regenerative Thermal Oxidizers.

BACKGROUND OF THE INVENTION

Conventional ceramic heat-transfer media used in RTOs typically consist of 70~75% $SiO_2$, 20~25% $Al_2O_3$, 2~5% $K_2O$ or $Na_2O$, and trace amounts of Fe, Ca, and Ti. The media can be shaped like honeycombs, plates, saddles, or other forms. When ceramic media having such composition are used in an alkaline environment, reactions will occur between the surface of the media and the alkaline component.

As a result, a layer of reaction products builds up on the surface of the media, which increases in thickness over time such that the effective void fraction of the media is decreased. The reduction in void fraction eventually reaches a point at which the increased pressure drop of gas flowing through the media impairs the operating efficiency and performance of the equipment, which then has to be shut down to permit replacement of the media. This not only adds to the cost of media, but it may also result in lost production.

Alkali-resistant ceramics used in the metal finishing and glass industries contains silicon carbide, silicon nitride, alumina, zirconia, and similar materials that have to be formed under high pressure. As a result, these ceramics are quite expensive. More importantly, these ceramic compositions cannot be shaped using ordinary methods, so they often cannot be made into the same shapes as conventional ceramic media.

U.S. Pat. No. 5,731,250 to Reid et al. teaches the use of zircon-based ceramic bodies made from a composition that can be formed by conventional processes. However, zircon is expensive, and it would be useful to make heat-exchange media from a material with even better resistance to alkali attack.

As is well known, regenerative thermal oxidizers (RTO) usually consist of two or more heat-exchange canisters with one combustion chamber. Heat-transfer media are installed in the heat-exchange canisters in order to store and release heat.

In the wood process industry, the waste gas treated by RTOs often contains substantial amounts of solid particulates. Analysis by scanning electron microscopy (SEM) indicates that the residue left on the media by partial oxidation of such solid particulates consists of:

TABLE 1

Composition of char/ash residue from wood dust

| Component | C | O | Na | Mg | Al | Si | S | K | Ca |
|---|---|---|---|---|---|---|---|---|---|
| Percent | 68.56 | 27.71 | 0.83 | 0.71 | 0.36 | 0.5 | 0.5 | 0.44 | 0.37 |

Additional analysis using Auger electron spectroscopy (AES) shows that wood ash contains large amounts of $Na_2SO_4$, $K_2CO_3$, $CaCO_3$, MgO, $Al_2O_3$, $SiO_2$ and other inorganic compounds. At the operating temperature of an RTO (850° C.), these components can become corrosive. The corrosive nature of these compounds can cause chemical reactions with ordinary porcelain or stoneware. These reactions can reduce the void fraction of the media and impair the performance of the RTO.

Analysis of media that had been installed in an RTO for ten months reveals that the surface layer of the media contained the same components as wood ash, indicating that the wood ash has reacted with that layer of ceramic material.

TABLE 2

Surface composition of chemical porcelain media after 10 months in RTO

| Component | C | O | Na | Mg | Al | Si | S | K | Ca |
|---|---|---|---|---|---|---|---|---|---|
| Percent | 20.34 | 42.88 | 15.12 | 0.7 | 7.57 | 9.59 | 3.17 | 0.33 | 0.7 |

Analysis by AES and X-ray diffraction spectroscopy shows that the surface layer consists of sodium aluminosilicate ($Na_2AlSiO_4$), potassium aluminosilicate ($K_2AlSiO_4$), and various other compounds of potassium, calcium, aluminum, silicon and/or sulfur. These are the reaction products that cause problems with the media.

There is therefore a need for an economical alkali-resistant ceramic material that can solve the problem of chemical attack by hot alkali in RTOs.

DESCRIPTION OF THE INVENTION

The present invention provides an alkali-resistant material comprising 20~80 wt % MgO, 10~50 wt % $SiO_2$, 5~30 wt % $Al_2O_3$, and 1~10 wt % $Fe_2O_3$, CaO, $Ka_2O$ and/or $Na_2O$, with forsterite and spinel being the dominant crystalline phases.

The MgO may be derived from oxides of magnesium or from talc. The $SiO_2$ and $Al_2O_3$ may be derived from clay.

The alkali-resistant material in accordance with the present invention can be formed in the same way as conventional ceramic media. The raw materials are ground up into particles, 80% of which are smaller than 50 microns and mixed with water to form a paste which can be extruded or pressed into shape, then dried and fired at 1,250° C.~1,450° C.

This alkali-resistant material can also be applied as a surface coating to conventional ceramic media shapes. The coated product is then fired at 1,250° C.~1,450° C. Among the chemical reactions that may occur are the following:

$Al_2O_3 + MgO \rightarrow MgAl_2O_4$ $Al_2O_3 + 2\, MgO \rightarrow Mg_2Al_2O_5$ $2\, MgO + SiO_2 \rightarrow Mg_2SiO_4$ After firing, the material has porosity less than 5% by volume, water absorption less than 5% by weight, and compressive strength greater than $2 \times 10^8$ $N/m^2$. Analysis by x-ray diffraction spectroscopy reveals the characteristics peaks of forsterite and spinel, indicating that these are the predominant crystalline phases. There is no evidence of any quartz phase.

The ceramic material in accordance with the present invention, when used at temperatures between 200~1,100° C., shows high resistance to alkali attack.

EXAMPLE 1

Ceramic saddles were prepared from the alkali-resistant material in accordance with present invention. The alkali-resistant material was prepared from the following raw materials:

Alkali-Resistant Ceramic Material

| Raw Materials (weight %) | | Chemical Composition of the Raw Materials (weight %) | |
|---|---|---|---|
| Roasted Magnesia | 80 | MgO | 76.3 |
| Ceramic Clay | 14 | $SiO_2$ | 13.6 |
| Limestone | 5 | $Al_2O_3$ | 5.2 |
| Water Glass | 1.0 | CaO | 2.9 |
| Carboxymethyl Cellulose | 1.5 | $K_2O$ | 0.4 |
| | | $Na_2O$ | 1.4 |
| | | $Fe_2O_2$ | 0.2 |

The raw materials listed above were ground in the dry state to a particle size less than 50 microns for 80% of the particle. Water is then mixed into the ground material to make a homogeneous paste. A pressure filter was then used to remove the excess water. Once the water content was less than. 23%, the mixture was formed into the shape of saddles. The shaped material was dried for two hours at 110° C., then fired at 1,350° C. in a kiln for 19 hours.

1. Accelerated Alkali Corrosion Test:

Specimens of conventional chemical porcelain saddles, zircon-based ceramic bodies (Ty-Pak™ Heat Sink Media (HSM) from Norton Chemical Process Inc., Akron, Ohio) and the alkali-resistant saddles in accordance with the present invention were buried under pure potassium carbonate (melting point 891° C.). The saddles and the $K_2CO_3$ were heated to 950° C. and kept at that temperature for 8 hours. This allowed molten $K_2CO_3$ to contact the specimens on all sides. The specimens were then cooled, washed with water, and dried.

TABLE 3

Corrosion resistance of porcelain, zircon-based ceramic (Ty-Pak ™ HSM), and alkali-resistant saddles in accordance with the present invention after 8 hours in molten $K_2CO_3$

| | Weight before Test $W_1$ (gm.) | Weight after Test $W_2$ (gm.) | Weight Change (%) $\Delta W$ |
|---|---|---|---|
| Porcelain Saddles | 11.0625 | 8.1572 | −26.3% |
| Ty-Pak ™ HSM | 4.6687 | 4.4869 | −3.9% |
| Alkali Resistant Saddles | 10.2478 | 11.0957 | 0.2% |

Change in weight: $\Delta W = (W_2 - W_1)/W_1 \times 100\%$

As shown in Table 3, porcelain saddles and Ty-Pak HSM lost 26% and 3.9% of their original weights, respectively, due to $K_2CO_3$ corrosion. The weight change for alkali-resistant saddles in accordance with the present invention was only 0.2%. At high temperatures, $K_2CO_3$ reacted with $SiO_2$, the main component of porcelain, to form a 1-mm layer of glassy, water-soluble $K_2SiO_4$. After washing with water, the porcelain saddles lost 26% of their mass. In contrast, little glaze formed on the alkali-resistant saddles in accordance with the present invention, and they lost very little mass when washed.

Physical examination revealed that the size of the porcelain saddle decreased due to corrosion. The surface of the Ty-Pak™ HSM also revealed some corrosion, and surface flaking. In contrast, the alkali-resistant saddles in accordance with the present invention showed very little change on the surface.

2. Ash Build-Up Resistance Test:

Porcelain saddles, zircon-based ceramic bodies, and alkali-resistant saddles in accordance with the present invention were buried under wood ash. The wood ash was heated to 870° C. and maintained at that temperature for 40 hours. The specimens were then washed, dried and weighed.

TABLE 4

Build-up of residue on porcelain, zircon-based ceramic (Ty-Pak ™ HSM), and alkali-resistant saddles in accordance with the present invention after 40 hours in wood ash

| | Weight before Test $W_1$ (gm.) | Weight after Test $W_2$ (gm.) | Weight Change (%) $\Delta W$ |
|---|---|---|---|
| Porcelain Saddles | 10.6687 | 11.1168 | 4.2 |
| Ty-Pak ™ HSM | 12.1354 | 12.2946 | 1.31 |
| Alkali Resistant Saddles | 11.2245 | 11.2918 | 0.6 |

Change in weight: $\Delta W = (W_2 - W_1)/W_1 \times 100\%$

As can be seen in Table 4, the alkali-resistant saddles in accordance with the present invention saddles showed the lowest weight change, suggesting good resistance to wood ash build-up. The alkali-resistant saddles did not significantly react with alkaline components of wood ash. The surface of the alkali-resistant saddles was covered with the deposits of the low-melting-point components in wood ash, which washed off easily. In contrast, the $SiO_2$ in the porcelain saddles reacted with the wood ash at high temperature. The wood ash was therefore chemically bound to the porcelain saddles. With a combination of physical and chemical attachment, the overall weight of the porcelain saddles increased significantly.

3. Thermal Stress Test:

Porcelain saddles, zircon-based ceramic bodies (Ty-Pak™ HSM), and alkali-resistant saddles in accordance with the present invention were heated to 870° C. and the temperature maintained for 30 min. The saddles were then allowed to cool in ambient air. This test was repeated until the saddles cracked.

TABLE 5

Thermal stress test of porcelain, zircon-based ceramic (Ty-Pak ™ HSM), and alkali-resistant saddles in accordance with the present invention

| Breakage after cycles | Porcelain Saddles | Ty-Pak ™ HSM | Alkali Resistant Saddles |
|---|---|---|---|
| 10 | 3% | 0% | 0% |
| 20 | 10% | 0% | 0% |
| 50 | 100% | 0% | 0% |
| 100 | | 0% | 2% |

The normal operating temperature of RTOs is 850° C. The specimens were heated to 870° C. for this test, or 20° C. higher than normal operating temperature. This test showed that alkali-resistant saddles in accordance with the present invention have good resistance to thermal stress.

4. Crushing Strength, Water Absorption, and Porosity:

The crushing strength of the material was measured by the ASTM C515 standard test method. The water absorption and porosity were measured by the ASTM C373 standard test method. The results were as follows:

TABLE 6

Properties of conventional porcelain and alkali-resistant ceramic saddles in accordance with the present invention

|  | Crushing Strength of Saddles (N/m$^2$) | Water Absorption (%) | Porosity (%) |
|---|---|---|---|
| Porcelain Saddles | 1,270 | 0.2 | 0.5 |
| Alkali Resistant Saddles | 2,168 | 0.4 | 1.1 |

EXAMPLE 2

A batch of alkali-resistant saddles with slightly different composition was prepared and tested the same way as in Example 1.

Alkali-Resistant Ceramic Material

| Raw Material (weight %) |  | Chemical Composition of the Raw Materials (weight %) |  |
|---|---|---|---|
| Light Magnesia | 40 | MgO | 44.6 |
| Powdered Talc | 27 | SiO$_2$ | 38.2 |
| Ceramic Clay | 30 | Al$_2$O$_3$ | 10.4 |
| Calcium Carbonate | 3 | CaO | 1.6 |
| Carboxymethyl Cellulose | 1 | K$_2$O | 1.8 |
|  |  | Na$_2$O | 0.9 |
|  |  | Fe$_2$O$_3$ | 0.5 |

Test Results:

Accelerated Alkali Corrosion Test: ΔW (%)=0.6%

Thermal Stress Test: Breakage after 20 cycles=0%

EXAMPLE 3

A batch of alkali-resistant saddles with slightly different composition was prepared and tested the same way as in Example 1.

Alkali-Resistant Ceramic Material

| Raw Material (weight %) |  | Chemical Composition of the Raw Materials (weight %) |  |
|---|---|---|---|
| Light Magnesia | 22 | MgO | 25.4 |
| Powdered Talc | 16 | SiO$_2$ | 47.2 |
| Ceramic Clay | 54 | Al$_2$O$_3$ | 20.1 |
| Barium Carbonate | 3 | BaO | 1.6 |
| Water Glass | 4 | CaO | 2.4 |
| Carboxymethyl Cellulose | 1 | K$_2$O | 1.0 |
|  |  | Na$_2$O | 1.2 |
|  |  | Fe$_2$O$_3$ | 0.5 |

Test Results:

Accelerated Alkali Corrosion Test: ΔW (%)=1.8%

Thermal Stress Test: Breakage after 20 cycles=2.0%

EXAMPLE 4

A mixture of 80 wt % roasted magnesia, 10 wt % ceramic clay, 9.0 wt % limestone, 1 wt % water glass, and 1 wt % carboxymethyl cellulose was ground to a particle size of less than 30 microns. This mixture was then applied as a coating onto saddles made of ordinary clay (75 wt % SiO$_2$, 20 wt % Al$_2$O3, 4 wt % K$_2$O or Na$_2$O, 2 wt % Fe$_2$O$_3$). The saddles were then dried at 110° C., and fired at 1,300° C. in a kiln.

Test Results:

Accelerated Alkali Corrosion Test: ΔW (%)=0.8%

Thermal Stress Test: Breakage after 20 cycles=10%

From the above examples and data, it will therefore be clear that, by controlling the composition as taught in the present invention, it is possible to produce a ceramic material that is substantially resistant to attack by alkali salts within the operating environment of a RTO.

I claim:

1. A process for the production of an alkali-resistant ceramic body comprising the steps of:

a) grinding together a mixture comprising 0% to 40% by weight of light magnesia, 0% to 80% by weight of roasted magnesia, 10% to 54% by weight of ceramic clay, 0% to 9% by weight of limestone, 0% to 4% by weight of water glass, 0% to 1.5% by weight of carboxymethyl cellulose, 0% to 27% by weight of talc, and 0% to 3% by weight of calcium or barium carbonate to a particle size of less than 50 microns for 80% of the particles wherein the amount of light magnesia or roasted magnesia in the paste is between 22 to 80% by weight;

b) mixing the ground mixture with water to produce a paste containing less than 23% by weight of water, c) shaping the paste to a desired shape;

d) drying the shaped product at 110 degrees centigrade to make it suitable for firing in a kiln; and e) firing the dried shaped product in a kiln at 1,250 to 1,450 degrees centigrade.

2. A process for coating a conventional ceramic body with an alkali-resistant ceramic coating comprising the steps of:

i) preparing an alkali resistant ceramic coating by grinding together 80% by weight of roasted magnesia 10% by weight of ceramic clay, 9% by weight of limestone, 1.0% by weight of water glass, and 1.0% by weight of carboxymethyl cellulose to a particle size of less than 30 microns for 80% of the particles;

ii) mixing the ground mixture with water to produce a paste containing less than 23 by weight of water;

iii) applying a coating of the alkali resistant material paste to the surface of the conventional ceramic body;

iv) drying the coated ceramic body at 100 degrees centigrade; and v) firing the dried coated ceramic body in a kiln at 1,300 degrees centigrade.

* * * * *